United States Patent [19]

Peru

[11] Patent Number: 4,817,715
[45] Date of Patent: Apr. 4, 1989

[54] AQUEOUS FLOODING METHODS FOR TERTIARY OIL RECOVERY

[75] Inventor: Deborah A. Peru, Bartlesville, Okla.

[73] Assignee: IIT Research Institute, Chicago, Ill.

[21] Appl. No.: 62,777

[22] Filed: Jun. 15, 1987

[51] Int. Cl.$^4$ .............................................. E21B 43/22
[52] U.S. Cl. ................................... 166/266; 166/267; 166/274; 166/275; 252/8.554
[58] Field of Search ............... 166/266, 267, 273, 274, 166/275; 252/8.554

[56] References Cited

U.S. PATENT DOCUMENTS

| | | | |
|---|---|---|---|
| 3,107,726 | 10/1963 | Greenwald | 166/275 |
| 3,493,051 | 2/1970 | Gogarty | 166/274 |
| 3,498,379 | 3/1970 | Murphy | 166/273 |
| 3,599,716 | 8/1971 | Thompson | 166/273 |
| 3,637,018 | 1/1972 | Kelly et al. | 166/272 |
| 3,804,170 | 4/1974 | Krehbiel et al. | 166/270 |
| 3,804,171 | 4/1974 | Krehbiel et al. | 166/270 |
| 3,847,823 | 11/1974 | Clark et al. | 252/8.55 |
| 3,871,452 | 3/1975 | Sarem | 166/270 |
| 3,927,716 | 12/1975 | Burdyn et al. | 166/273 |
| 3,952,803 | 4/1976 | Kerfoot et al. | 166/270 |
| 3,977,470 | 8/1976 | Chang | 166/274 |
| 4,004,638 | 1/1977 | Burdyn et al. | 166/273 |
| 4,008,769 | 2/1977 | Chang | 166/274 |
| 4,099,569 | 7/1978 | Bousaid | 166/273 |
| 4,232,737 | 11/1980 | Tyler et al. | 166/273 |
| 4,274,488 | 6/1981 | Hedges et al. | 166/273 |
| 4,433,730 | 2/1984 | Trushenski | 166/274 |
| 4,502,541 | 3/1985 | Lawson et al. | 166/275 |
| 4,561,501 | 12/1985 | Shaw et al. | 166/273 |

Primary Examiner—Stephen J. Novosad
Assistant Examiner—Bruce Kisliuk
Attorney, Agent, or Firm—Fitch, Even, Tabin & Flannery

[57] ABSTRACT

A method of aqueous flooding of subterranean oil bearing formation for tertiary oil recovery involves injecting through a well into the formation a low alkaline pH aqueous sodium bicarbonate flooding solution. The flooding solution's pH ranges from about 8.25 to 9.25 and comprises from 0.25 to 5 weight percent and preferably about 0.75 to 3.0 weight percent of sodium bicarbonate and includes a petroleum recovery surfactant of 0.05 to 1.0 weight percent and between 1 and 20 weight percent of sodium chloride. After flooding, an oil and water mixture is withdrawn from the well and the oil is separated from the oil and water mixture.

6 Claims, 18 Drawing Sheets

AQUEOUS FLOODING METHODS FOR TERTIARY OIL RECOVERY

This invention was made with the government support under Contract No. DE-FC22-83FE60149 awarded by the Department of Energy. The government has certain rights in this invention.

BACKGROUND OF THE INVENTION

This invention relates to methods for tertiary recovery of petroleum from subterranean reservoirs, and more particularly relates to new aqueous alkaline flooding methods for displacing and recovering petroleum from a reservoir containing acidic crude oils.

Oil displacement from acidic oil reservoirs may conventionally be carried out by secondary or tertiary flooding processes such as aqueous alkaline flood processes in which an alkaline solution is injected into the oil reservoir to form surfactants by reaction with naturally occurring acids, inactivate polyvalent cations and to displace the oil from the sandstone and other constituents of the reservoir.

Substantial technical effort has been directed to the development of alkaline flood processes for tertiary oil recovery methods. Such efforts have been particularly directed to methods involving injecting an aqueous alkaline solution containing a surfactant, into the subterranean reservoir by means of injection wells, and withdrawing an oil-water mixture through one or more production wells. The patent literature describes injecting an aqueous alkaline solution to satisfy the surfactant adsorption sites on the reservoir rock and then injecting a surfactant-containing aqueous liquid which may also contain alkali. As discussed in U.S. Pat. No. 3,927,716, the alkali content may be adjusted to achieve the lowest interfacial tension between the flooding solution and the oil, which may occur at low alkali concentration. U.S. Pat. Nos. 3,804,170; 3,804,171 and 3,847,823 describe injecting aqueous alkaline solutions containing petroleum sulfonate surfactants which are formed by overneutralizing petroleum hydrocarbon sulfonates. U.S. Pat. Nos. 3,977,470 and 4,004,638 similarly relate injecting aqueous alkaline solutions, which may be followed by an aqueous alkaline solution containing a hydrocarbon sulfonate surfactant as well as polyphosphates and carbonates.

U.S. Pat. No. 4,099,569 describes a staged process for recovering oil from a subterranean reservoir by injecting a surfactant solution in which the concentration of the surfactant is increased as increasing amounts of the solution are injected and then injecting a drive fluid. U.S. Pat. No. 4,232,737 describes a staged injection of a highly saline aqueous petroleum sulfonate surfactant system containing a solubilizing amount of cosurfactant and decreasing the concentration of both the salt and surfactant in stages to provide a trailing-edge salinity which is suitable for polymer thickened aqueous drive fluid.

However, such conventional methods of tertiary oil recovery have a variety of deficiencies in terms of cost, efficiency or deleterious side effects. For example, as suggested in U.S. Pat. 4,502,541, significant portions of alkali are consumed in conventional alkaline flooding processes by reaction with siliceous and carbonate minerals and consequent formation and dissolution of alkali metal silicates and carbonates. Such reactions are promoted at the condition of elevated temperature and pressure which may typically be present in the subterranean oil reservoir. Such reactions may cause the alkali to propagate slowly through the reservoir rocks, unnecessarily consuming the flooding solution components, and providing a solute component which is capable of precipitation and causing scale formation.

Such conventional alkaline flooding methods accordingly may encounter numerous problems which may diminish their oil recovery, cost effectiveness, and/or efficiency. For example, the precipitation of silicates and/or carbonates in the production well bore may be a significant disadvantage in such tertiary oil production methods. Such silicates and carbonates, which are produced and dissolved at the high temperature and pressure in the reservoir system may be readily precipitated out of solution in the production well as the pressure and temperature decrease upon withdrawal of the oil-flood water mixture from the production well bore. In this regard, as the petroleum/alkaline mixture rises to the surface, the pressure and temperature are dramatically decreased, gases are liberated, and the carbonates and/or silicates may precipitate to diminish or plug the bore.

As a result of cost and other deficiencies, tertiary recovery methods are not presently widely used in commercial production. Accordingly, there is a need for economical and effective aqueous flooding methods for tertiary oil recovery which would increase the recovery of petroleum from existing wells and otherwise nonproductive reservoirs. Accordingly, it is an object of the present invention to provide aqueous flooding methods for tertiary oil recovery which have improved economy, which reduce the detrimental effects of silicate and carbonate precipitation, and which are capable of efficient, effective and economical recovery of petroleum. These and other objects will be apparent from the following detailed description and the accompanying drawings.

DESCRIPTION OF THE INVENTION

Figure 1:
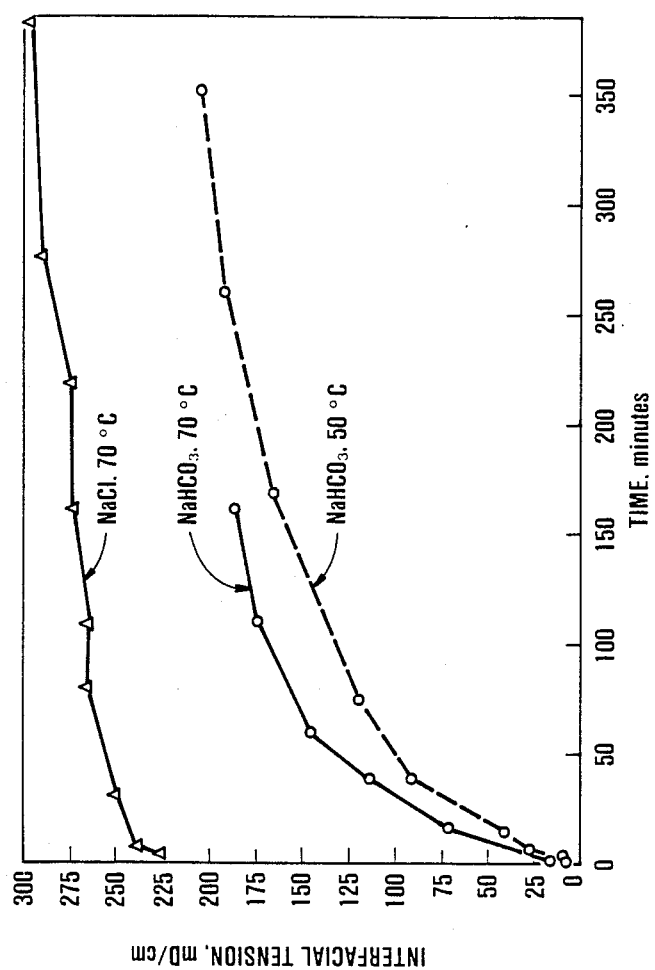
FIG. 1 is a graphical representation of interfacial tension versus time for non-preequilibrated systems using brines which contain 0.1 percent sulfated, polyethoxylated alcohol surfactant (Neodol 25-3S) and either 1.2 percent sodium bicarbonate plus sodium chloride or sodium chloride alone, for which the equivalent sodium chloride concentration is 9.66 percent based on total sodium.

Generally, in accordance with the present invention, methods are provided for aqueous flooding of subterranean petroleum bearing formations for tertiary oil recovery. In accordance with such tertiary oil recovery methods, at least one production well is provided having at least one inlet within the subterranean petroleum bearing formation, and at least one injection well is provided having at least one outlet within the subterranean petroleum bearing formation. Such petroleum bearing formations are typically composed of sandstone, and may include various carbonate materials. Injection and production wells may be drilled and utilized in accordance with conventional practice. An important aspect of the present methods is injecting into the petroleum bearing formation through the injection well, a low alkaline pH aqueous sodium bicarbonate flooding solution having a pH in the range of from about 8.25 to about 9.25 comprising from about 0.25 to about 5 weight percent, and preferably from about 0.75 to about 3.0 weight percent of sodium bicarbonate, from about 0.05 to about 1.0 weight percent of petroleum recovery surfactant, and from about 1 to about 20 percent of sodium chloride, based on the total weight of the aqueous flooding solution.

The methods further include the steps of withdrawing through the production wells, an oil and water mixture comprising petroleum from the subterranean petroleum bearing formation and at least a portion of the low alkaline pH sodium bicarbonate aqueous flooding solution, and separating the oil from the aqueous oil and water mixture. In accordance with conventional practice, such separation may be carried out by settling or centrifugation of the mixture.

The utilization of a low pH sodium bicarbonate containing alkaline flooding solution is an important part of the present method. As indicated, the low solids content alkaline aqueous flooding solution has a pH in the range of from about 8.25 to about 9.25. It has been found that the utilization of sodium bicarbonate of relatively low solution pH surprisingly permits efficient oil recovery at low cost, without significant reaction with subterranean rock formations to form silicate and/or carbonate solutes, which would otherwise deplete the alkali content, and present potential plugging, or scaling problems in the production well. In this latter regard, it is noted that as the pressure of the mixture decreases upon withdrawal through the production well, dissolved gases are evolved, and the temperature decreases, thereby reducing the solubility product of carbonate and silicate mineral components which may be present. If such dissolved mineral components are formed by reaction of conventional alkaline pH flooding agents with the reservoir minerals, these components may accordingly be precipitated in the production well bore. Thus, not only is the alkaline agent uneconomically consumed, but its reaction product may foul the well bore.

In accordance with the present invention, by providing low pH aqueous flooding solutions which are substantially nonreactive with the reservoir minerals, yet highly effective in oil recovery, economical tertiary recovery of oil may be accomplished together with achieving reduced cost of raw materials.

Moreover, the present low pH alkaline aqueous flooding agents may utilize relatively low concentrations of surfactant, while providing highly effective and efficient oil recovery.

The surfactant component may be a conventional tertiary oil recovery surfactant. The surfactant may be an amphiphilic compound which may be somewhat soluble in the reservoir oil, and which is also soluble in the low pH bicarbonate aqueous flooding solution. Suitable surfactants comprise amphiphilic surfactant compounds in which the polar groups are sulfates, sulfonates, nitrates, carboxylates, phosphates, phosphonates, betaines, imidazolines, alcohols, amides or the alkoxylated derivatives of amphiphilic molecules containing such polar groups. The non-polar parts of such amphiphilic molecules can be, but are not restricted to, aliphatic, aromatic or aliphatic-substituted aromatic hydrocarbon groups. Particularly suitable surfactants are typified by polyalkoxyalcohol sulfate surfactants such as NEODOL 25-3S (a polyethoxy aliphatic alcohol sulfate surfactant from Shell Chemical Company) and petroleum sulfonate surfactants such as TRS-10-410 petroleum sulfonate product of Witco Chemical Company. Other surfactant compositions include aromatic ether polysulfonates, such as the Dowfax aromatic ether polysulfonate surfactants described in U.S. Pat. No. 3,945,437 by Y. C. Chiu, et al., amyl or isopropyl alcohol, Igepon Tc-42 or T-43 (sodium N-methyl-N-alkyl acid tartrate from G.A.F.), Triton X-200 (sodium alkyl aryl polyether sulfonate, from Rohm and Haas), Ethomed HT 15 (ethylene oxide condensates of fatty acid amines from Armak), Aerosol OT (dialkyl ester of sodium sulfosuccinic acid from American Cyanamid), Gafac L0529 (sodium salt of organic phosphate ester from G.A.F.), Stepanflo (alphasolefin sulfonate surfactant, from Stepan Chemical Co.), petroleum acid soaps such as the sodium salt of Sunpatic Acid B (from Sun Chemical Co.), propoxylated ethoxylated nonionic surfactants such as those described in U.S. Pat. No. 4,293,428, and amphiphilic coupling agents of the type described in U.S. Pat. No. 3,330,314, by J. Reisberg.

As also indicated, the aqueous low alkaline pH sodium bicarbonate flooding solution contains from about 1 to about 20 weight percent sodium chloride. The amount of sodium chloride utilized for a recovery from a particular subterranean reservoir is typically determined in the connate water salinity of the reservoir. The surfactant for use in a particular reservoir may be selected by interfacial tension testing and emulsion screening tests. The weight percent of sodium chloride will accordingly depend upon the connate water salinity of the reservoir.

The low alkaline pH flooding solution may further contain other solid components such as organopolymeric water thickening agents which are conventionally utilized in tertiary oil recovery. Examples of suitable water thickeners include Flocon 4800C biopolymer (from Pfizer Corporation), Xanthan gum polymers such as Xanflood QC-128 (from the Kelco Chemical Co.), the Polytran water thickeners (from Pillsbury Company), and the acrylamide polymeric materials such as Pusher chemicals (from Dow Chemical Company). Typically, such thickening agents may be present in the low alkaline pH flooding solution at a level of from about 0.05 to about 0.25 weight percent, based on the total solution weight.

Methods utilizing such aqueous flooding methods in accordance with the present invention have significant cost and efficiency benefits, as will be apparent from the following detailed description of testing directed to the present invention.

Testing was conducted to identify surfactants which are suitably compatible with conditions (i.e., salinity and alkalinity) associated with tertiary recovery of petroleum. Compatible surfactants were then used to demonstrate that the low pH (pH 9) process of the present invention provides efficient, economical recovery while substantially avoiding the problems of silicate mineral dissolution.

Optimal salinity ranges for various anionic and nonionic surfactant solutions were evaluated by performing salinity scan experiments at a water/oil ratio of 1 using Wilmington crude oil (acid number 2.1 mg of KOH/g sample). The salinities tested ranged from 0.5 to 20 percent NaCl. At least six different salinities were tried for each surfactant/brine mixture. The brines contained added synthetic surfactant and either NaCl alone or NaCl plus sodium bicarbonate. A range of optimal salinities was determined for each system according to the screening guide presented in Table 1.

TABLE 1A

Commercial Surfactants Tested for Their Emulsion Phase Behavior with Sodium Bicarbonate ($NaHCO_3$)**

| Surfactants % active used | Molecular weight g/mole | Hydrophilic Lipophilic balance | Test Temp. °C. |
|---|---|---|---|
| Petroleum Sulfonates | | | |
| Witco TRS-10-40, 3% | 330/350 | | 45 |
| Witco TRS-10-410, 1% | 405/420 | | 45 |
| Alcohol Ethoxysulfate | | | |
| Neodol* 25-3S, 0.1% | 439 | | 70 |
| Nonionic Ethoxylates | | | |
| Neodol* 45-13, 0.1% | 790 | 14.4 | 70 |
| Neodol* 91-2.5, 0.1% | 279 | 8.6 | 45 |
| Neodol* 25-3, 0.1% | 336 | 7.9 | 45 |
| Neodol* 91-6, 0.1% | 425 | 12.5 | 45 |

*Product of Shell Chemical Company
**Screening Guide: Compatability is determined by performing salinity scans using a broad range of salinities and narrowing it under optimal conditions. Before creaming, an amber-brown discoloration near the oil-water interface occurred in systems found compatible. This is due to an increased solubility of the in-situ generated surfactants into the brine phase. After creaming, compatability is indicated by a detectable increase in lower phase emulsification with increasing salinity.

TABLE 1B

Commercial Surfactants Tested for Their Emulsion Phase Behavior with Sodium Bicarbonate ($NaHCO_3$)**

| Surfactants % active used | Approximate optimal salinity region, equiv. % w/v | |
|---|---|---|
| | NaCl alone | $NaHCO_3$ + NaCl |
| Petroleum Sulfonates | | |
| Witco TRS-10-40, 3% | not compatible | |
| Witco TRS-10-410, 1% | 1.7–1.9 | 1.8–2.0 |
| Alcohol Ethoxysulfate | | |
| Neodol* 25-3S, 0.1% | >16 | >9 |
| Nonionic Ethoxylates | | |
| Neodol* 45-13, 0.1% | not determined | 5–6 |
| Neodol* 91-2.5, 0.1% | not compatible | |
| Neodol* 25-3, 0.1% | not compatible | |

TABLE 1B-continued

Commercial Surfactants Tested for Their Emulsion
Phase Behavior with Sodium Bicarbonate (NaHCO$_3$)**

| Surfactants % active used | Approximate optimal salinity region, equiv. % w/v | |
|---|---|---|
| | NaCl alone | NaHCO$_3$ + NaCl |
| Neodol* 91-6, 0.1% | not compatbile | |

*Product of Shell Chemical Company
**Screening Guide: Compatability is determined by performing salinity scans using a broad range of salinities and narrowing it under optimal conditions. Before creaming, an amber-brown discoloration near the oil-water interface occurred in systems found compatible. This is due to an increased solubility of the in-situ generated surfactants into the brine phase. After creaming, compatability is indicated by a detectable increase in lower phase emulsification with increasing salinity.

Unless otherwise designated in the testing reported herein, percentage volumes are weight/volume percentages (active grams/100 ml of solution).

Interfacial tension measurements were made on the most promising systems, two anionic and one nonionic, found in the salinity range tests. These measurements were performed using a spinning drop interfacial tensiometer. IFT measurements were made at the same temperature that the salinity scan tests were performed except when the effect of temperature was studied. Equilibration of the two phases occurred while spinning. IFT measurements were obtained immediately after the oil contacted the brine phase and continued up to 6 hours, or until the change in the IFT was less than 0.15 percent/minute. IFT values less than 0.1 dyne/cm are necessary to start mobilizing crude oil from the capillary pore spaces and channels of the reservoir rock. Values less than 0.001 dyne/cm are needed to displace the crude oil effectively.

Figure 2:
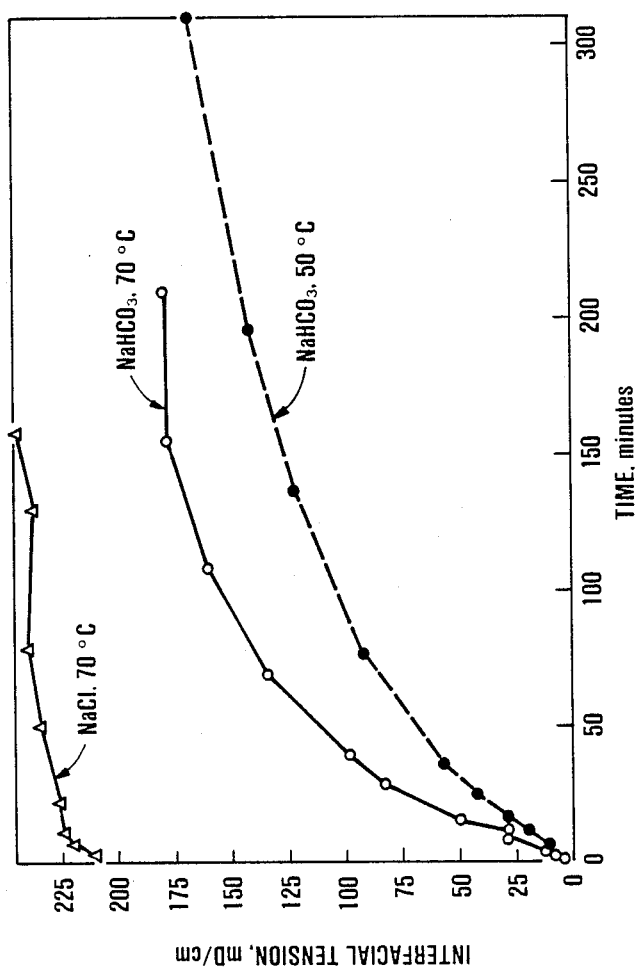
FIG. 2 is a graphical representation of interfacial tension versus time for non-preequilibrated systems using brines which contain 0.1 percent sulfated, polyethoxylated alcohol surfactant (Neodol 25-3S) and either 1.2 percent sodium bicarbonate plus sodium chloride or sodium chloride alone, for which the equivalent sodium chloride concentration is 10.66 percent based on total sodium content.

FIGS. 1 and 2 show interfacial tensions for brines containing anionic sulfated, polyethoxylated alcohol surfactant (Neodol 25-3S) and sodium bicarbonate at two salinities (equivalent NaCl concentrations, based on total Na, of 9.66 percent and 10.66 percent, respectively). The brines contained 0.1 percent sulfated, polyethoxylated alcohol surfactant (Neodol 25-3S) and either 1.2 percent sodium bicarbonate plus NaCl or NaCl alone. Both figures show that the equilibrated IFT for the sodium bicarbonate systems were lower than for the chloride systems alone indicating that a higher concentration of surfactant remained interfacially active.

Figure 3:
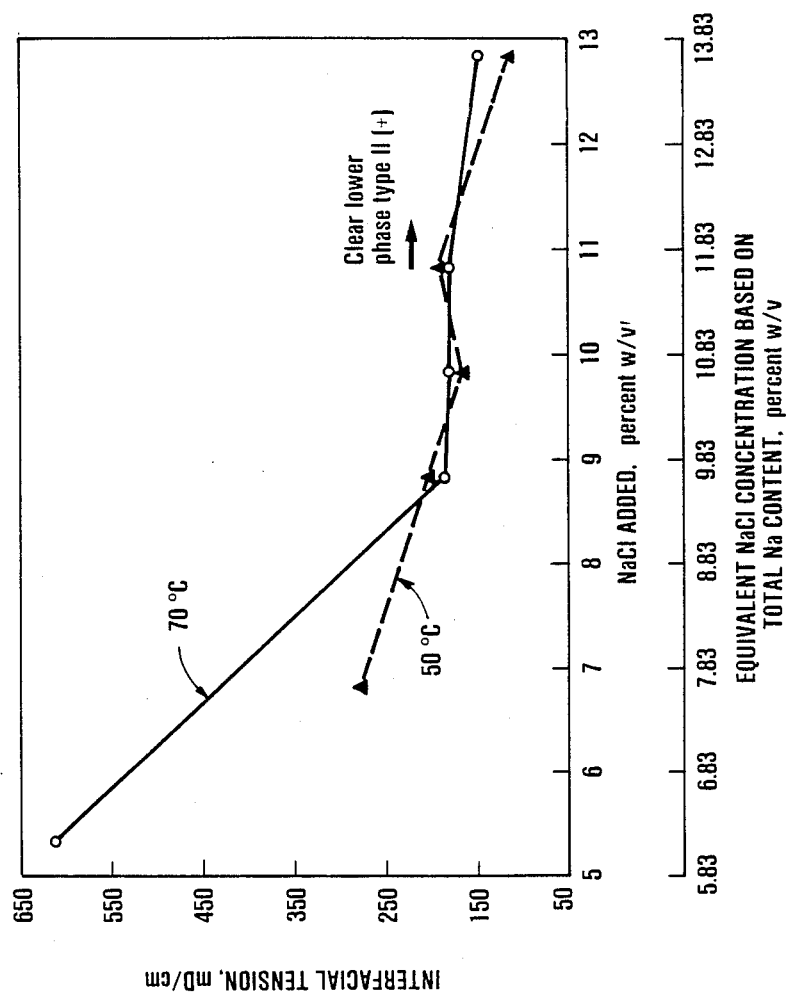
FIG. 3 is a graphical representation of interfacial tension versus equivalent sodium chloride concentration for equilibrated systems containing 0.1 percent ethoxysulfate and ether 1.2 percent sodium bicarbonate plus sodium chloride or sodium chloride alone.

FIG. 3 summarizes the effect of adding NaCl to sodium bicarbonate and sulfated, polyethoxylated alcohol surfactant (Neodol 25-3S). The equilibrated systems contained 0.1 percent ethoxysulfate and either 1.2 percent sodium bicarbonate plus NaCl or NaCl alone. The crude oil used was Ranger zone in the Wilmington field (California). The data show that as salinity increases, the equilibrated interfacial tension decreases.

From FIGS. 1, 2 and 3, it is evident that sodium bicarbonate broadens the useful salinity region of sulfated, polyethoxylated alcohol surfactant (Neodol 25-3S) to include lower salinity reservoirs. In addition, sodium bicarbonate induces very low interfacial tension upon initial contact with Wilmington crude oil.

Figure 4:
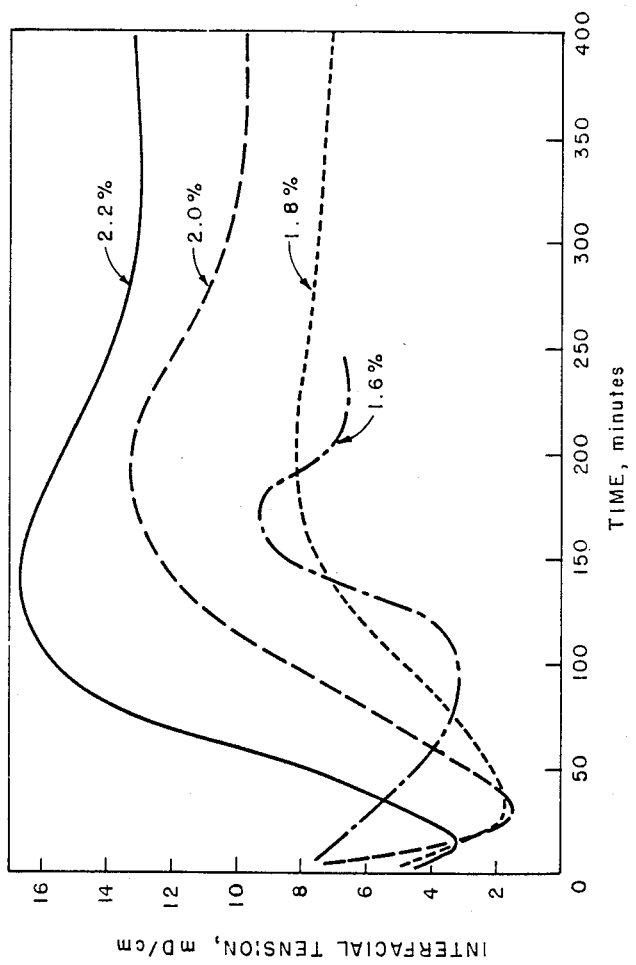
FIG. 4 is a graphical representation of interfacial tension versus time for non-preequilibrated systems for brines containing 1.2 percent sodium bicarbonate plus 0.1 percent active petroleum sulfonate (Witco TRS-10-410)

FIG. 4 shows the IFT versus time for systems containing anionic 0.1 percent active TRS-10-410 and 1.2 percent sodium bicarbonate at various salinities. FIG. 4 indicates than an increase in salinity increases the equilibrium interfacial tension and decreases the time necessary to reach the minimum IFT value. These interfacial tension measurements provided an optimal salinity for this particular synthetic surfactant within the salinity range described in Table 1. The optimal salinity found was equivalent to 1.8 percent NaCl which provided both a low equilibrium and minimum IFT value.

Figure 5:
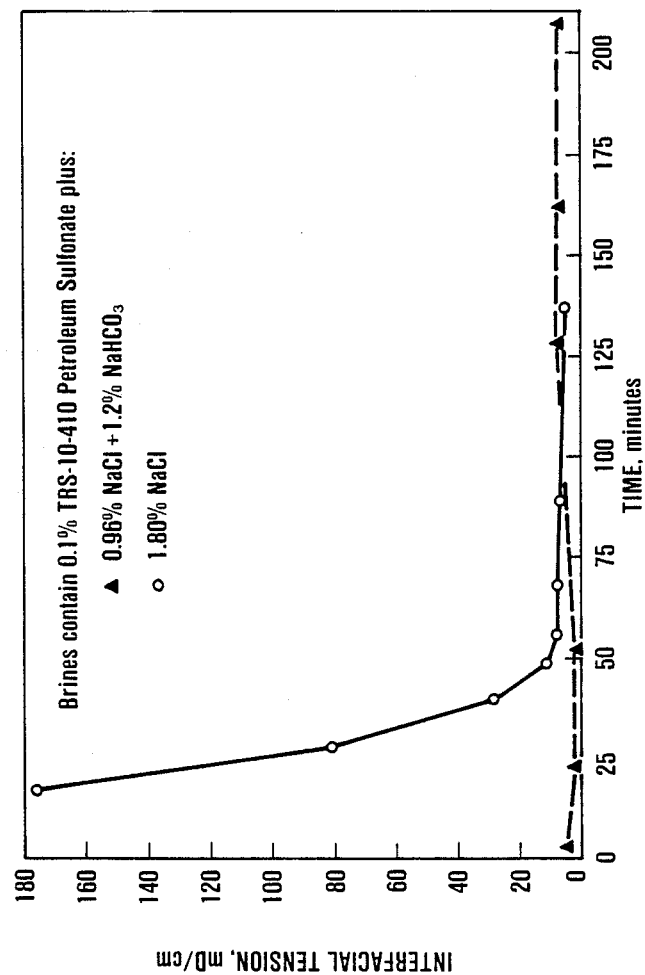
FIG. 5 is a graphical representation of interfacial tension versus time for non-preequilibrated systems for brines containing petroleum sulfonate and sodium chloride plus sodium bicarbonate or sodium chloride alone.

FIG. 5 graphically illustrates the interfacial tension obtained utilizing brines containing petroleum sulfonate surfactant (Witco TRS-10-410) and either sodium bicarbonate and sodium chloride or sodium chloride alone. These results demonstrate that ultra low interfacial tension (less than 0.01 dyne/cm), occurs extremely rapidly in the sodium bicarbonate system, but that it takes substantially longer for the sodium chloride system to approach the same interfacial tension.

Figure 6:
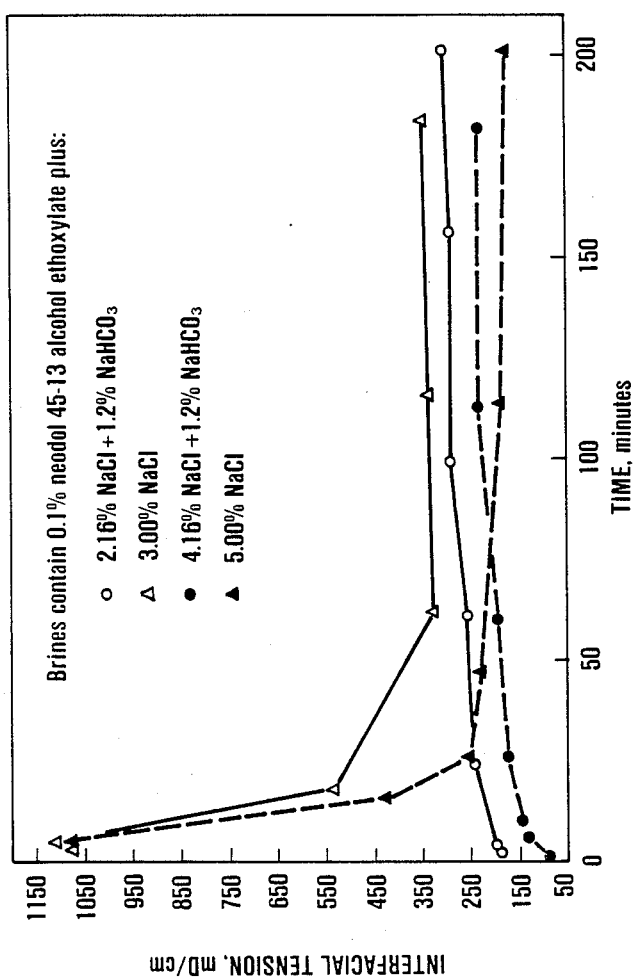
FIG. 6 is a graphical representation of interfacial tension versus time for non-preequilibrated systems containing nonionic surfactant for various concentrations of sodium chloride, with and without sodium bicarbonate.

FIG. 6 shows the IFT results for the most promising nonionic system as a function of time for solutions with and without sodium bicarbonate. The brines contained 0.1 percent alcohol ethoxylate plus either sodium bicarbonate and sodium chloride or sodium chloride alone. FIG. 6 indicates that inclusion of sodium bicarbonate in nonionic systems greatly enhances the effects on the interfacial tension.

IFT of nonionic systems is greatly affected by temperature. The optimal effects are near the surfactant's cloud point temperature. Using nonionics near their cloud point, however, leads to extremely high adsorption of the nonionic surfactant. This implies that nonionics should be used at temperatures below their cloud point to minimize adsorptive losses. Table 2 gives the cloud point of the four systems used in the measurements of FIG. 6.

TABLE 2

Cloud Point of Brines Containing 0.1% Neodol 45-13 Ethoxylate and Either Sodium Bicarbonate Plus Sodium Chloride or Sodium Chloride Alone

| Brines | Cloud Point, °C. |
|---|---|
| 1.2% NaHCO$_3$ plus: | |
| 4.2% NaCl | 79.0 |
| 2.2% NaCl | 87.5 |
| NaCl alone: | |
| 5.0% | 81.0 |
| 3.0% | 88.5 |

The improved effect on IFT using 5 percent brines resulted from the test temperature (75° C.) being within 5° C. of the cloud point.

Figure 7:
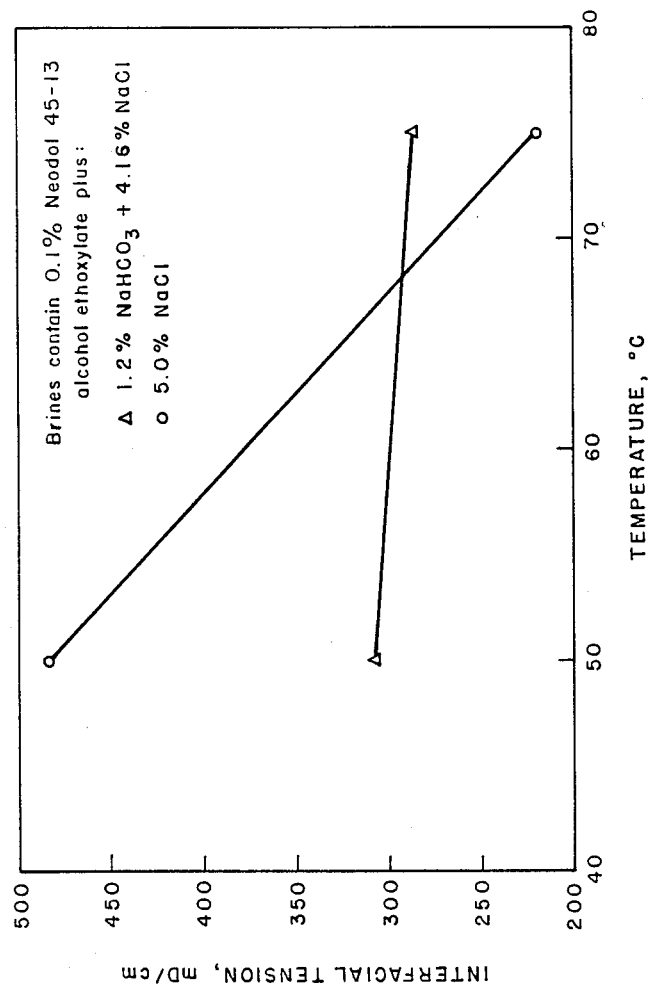
FIG. 7 is a graphical representation of interfacial tension as a function of temperature for equilibrated systems containing nonionic surfactant and either sodium bicarbonate plus sodium chloride or sodium chloride alone.

FIG. 7 shows IFT as a function of temperature for equilibrated systems containing a nonionic surfactant with either sodium bicarbonate plus NaCl or NaCl alone and Wilmington crude oil. The brines contained 0.1 percent Neodol 45-13 Ethoxylate with either 1.2 percent sodium bicarbonate plus 4.16 percent NaCl or 5.0 percent NaCl.

FIG. 7 indicates that by using sodium bicarbonate, lower temperatures can be used to minimize adsorption losses while maintaining a reasonable IFT.

Figure 8:
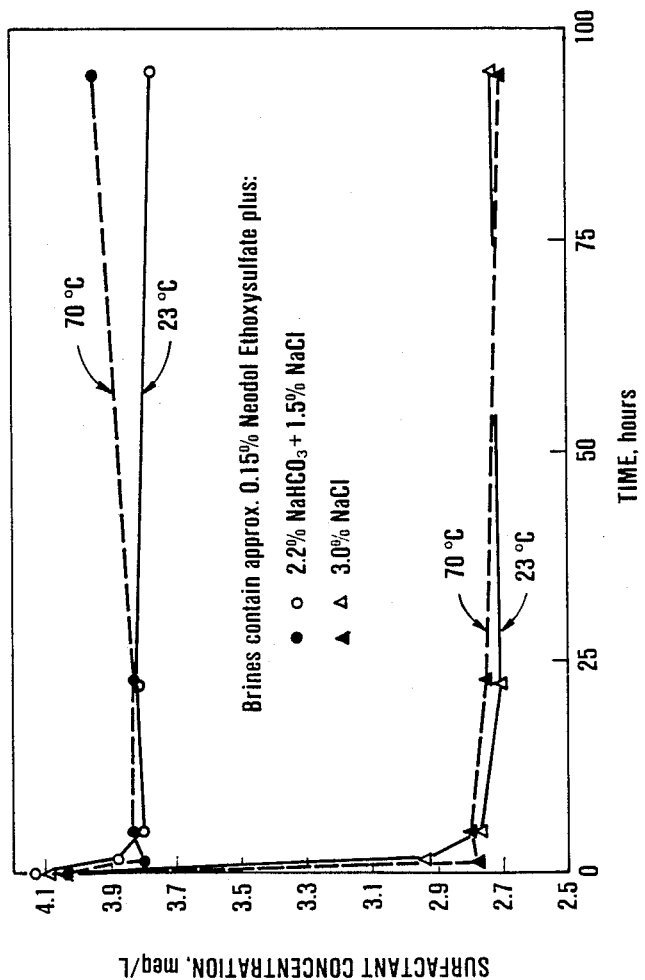
FIG. 8 is a graphical representation of supernatant surfactant concentration versus time illustrating adsorption of sulfated, polyethoxylated alcohol surfactant (Neodol 25-3S) onto kaolinite in the presence of either sodium bicarbonate plus sodium chlor de (pH 8.9) or sodium chloride alone (pH 6.6)

FIG. 8 shows the adsorption kinetics of surfactant at pH 6.6 and at pH 9. Batch tests were performed using kaolinite (clay) at a solid/liquid ratio of 0.1. Brines initially contained approximately 4 millimoles/liter of an alcohol ethoxysulfate (Neodol 25-3S), and either 3 percent NaCl or 1.5 percent NaCl plus 2.16 percent sodium bicarbonate. The minerals and brines were sealed in 250 mL polytetrafluoroethylene bottles and shaken continuously at room temperature (23° C.) and in a water bath (70° C.). Aliquots were removed periodically and centrifuged for 1 hour at 2,000 rpm to remove fine particles. Sulfate content of the samples was analyzed by colorimetric titration using a standardized Hyamine 1622 titrant. Kaolinite is a typical reservoir clay. Sodium bicarbonate was found to be very effective in inhibiting surfactant adsorption onto kaolinite.

Two linear corefloods were performed at 49° C. using unfired consolidated Berea sandstone. Prior to surfactant injection, the two Berea cores were equilibrated with a 3 percent NaCl solution containing 0.1 percent each of calcium and magnesium ions. The two Berea cores were then injected with either 3 percent NaCl brine or 1.5 percent NaCl plus 2.16 percent sodium bicarbonate brine. After injecting 2 pore volumes of each preflush solution, the cores were continuously injected with approximately 0.15 percent of a synthetic surfactant (Neodol 25-3S). Surfactant adsorption values were determined by the difference between the integrated areas of the injected and recovered surfactant effluent profiles.

Figure 9:
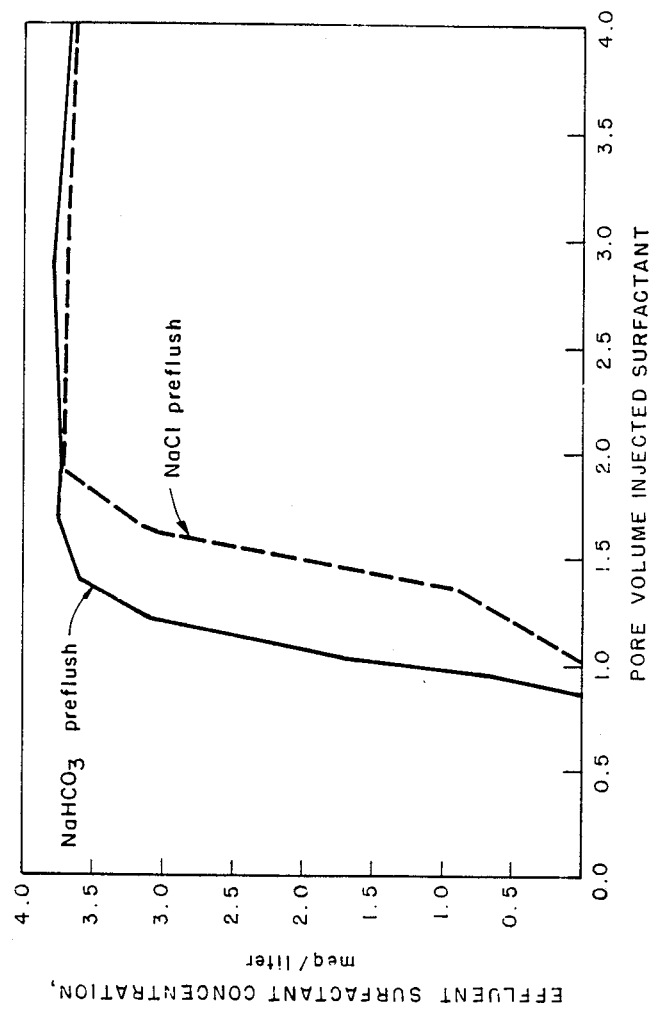
FIG. 9 is a graphical representation of effluent surfactant concentration versus pore volume of injected aqueous surfactant illustrating the effectiveness of sodium bicarbonate as a preflush during surfactant injection into cylindrical 10-in. Berea sandstone cores.
Figure 10:
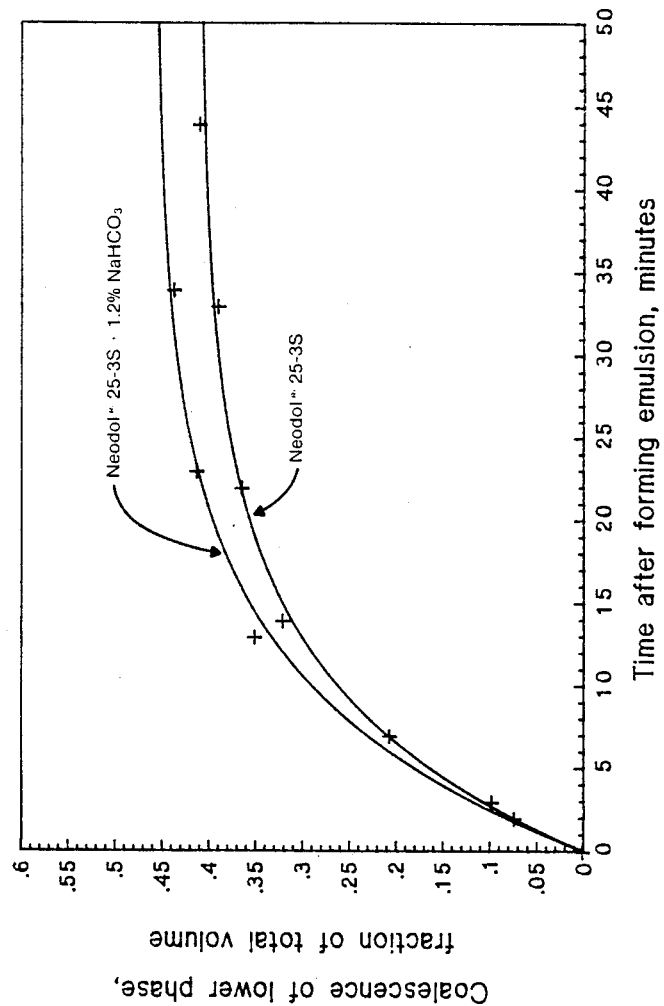
FIG. 10 is a graphical representation of coalescence of the lower phase versus time in systems containing Wilmington crude oil and 0.1 percent alcohol ethoxysulfate plus 3.83 percent sodium chloride alone or combined with 1.2 active percent sodium bicarbonate with a water/oil ratio equal to 1.
Figure 11:
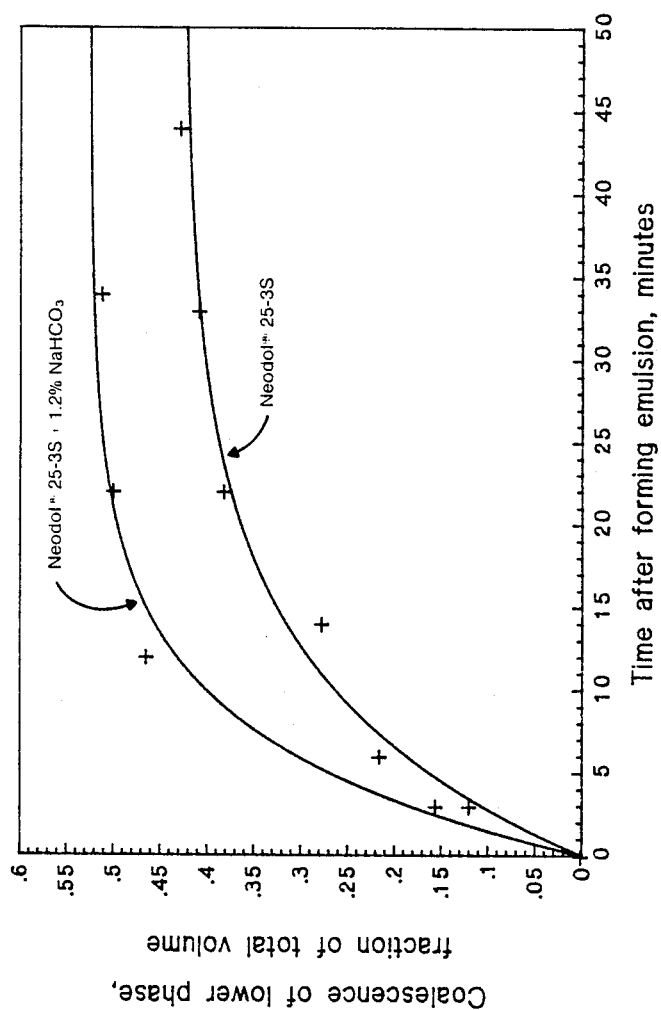
FIG. 11 is a graphical representation of coalescence of the lower phase versus time in systems containing Wilmington crude oil and 0.1 percent alcohol ethoxysulfate plus 5.33 percent sodium chloride alone or combined with 1.2 active percent sodium bicarbonate with a water/oil ratio equal to 1.
Figure 12:
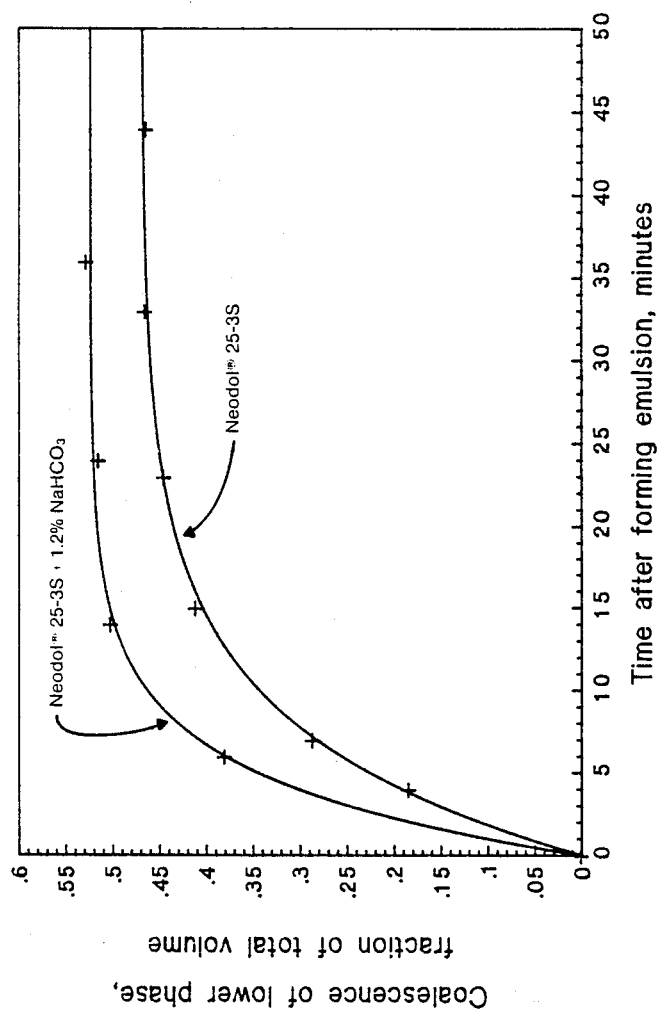
FIG. 12 is a graphical representation of coalescence of the lower phase versus time in systems containing Wilmington crude oil and 0.1 percent alcohol ethoxysulfate plus 6.83 percent sodium chloride alone or combined with 1.2 active percent sodium bicarbonate with a water/oil ratio equal to 1.
Figure 13:
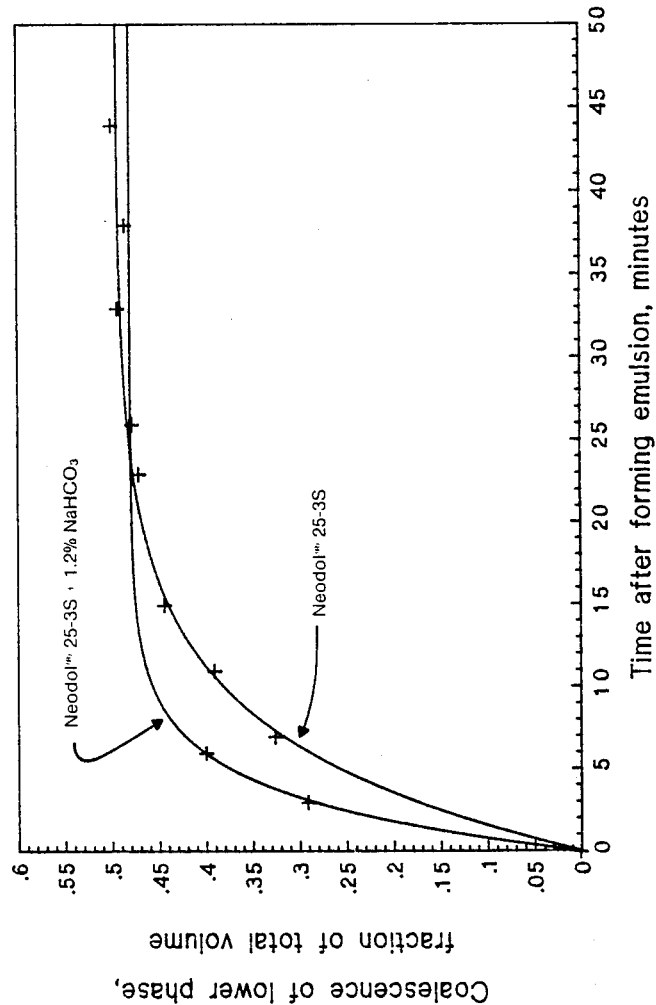
FIG. 13 is a graphical representation of coalescence of the lower phase versus time in systems containing Wilmington crude oil and 0.1 percent alcohol ethoxysulfate plus 10.83 percent sodium chloride alone or combined with 1.2 active percent sodium bicarbonate with a water/oil ratio equal to 1.
Figure 14:
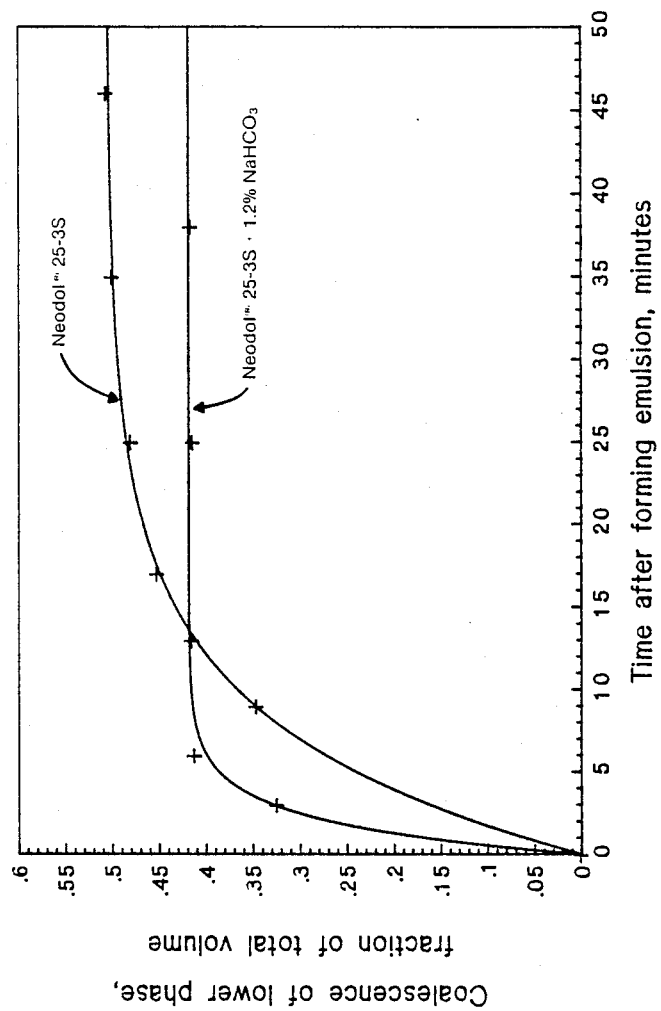
FIG. 14 is a graphical representation of coalescence of the lower phase versus time in systems containing Wilmington crude oil and 0.1 percent alcohol ethoxysulfate plus 12.83 percent sodium chloride alone or combined with 1.2 active percent sodium bicarbonate with a water/oil ratio equal to 1.

FIG. 9 indicates that when preflushing with sodium bicarbonate, the concentration of surfactant in the effluent reaches the injected concentration approximately 0.5 pore volumes sooner than when preflushing with sodium chloride. The use of a low alkaline pH sodium bicarbonate flooding agent effectively reduces surfactant adsorption on reservoir rocks.

Table 3 shows the results of the adsorption tests.

TABLE 3

| | milliequivalents adsorbed/100 g rock | | | |
|---|---|---|---|---|
| | Chloride Brine | | Sodium Bicarbonate Brine | |
| Rock | (23° C.) | (70° C.) | (23° C.) | (70° C.) |
| Batch Experiments | | | | |
| kaolinite solid/liquid = 0.1 | 1.36 | 1.33 | 0.36 | 0.09 |
| Coreflood Experiment | (49° C.) | | (49° C.) | |
| consolidated Berea sandstone | 0.019 | | 0.005 | |

Coalescence studies were performed on the same systems used in the emulsion screening tests. The systems contained Wilmington crude oil and aqueous chemicals at a WOR of 1. Brines contained either 0.1 percent ethoxysulfate and NaCl or 0.1 percent ethoxysulfate, 1.2 percent sodium bicarbonate plus NaCl at various total salinities. Emulsions were formed by using a hand homogenizer. The coalescence of the emulsions was observed by placing the phase tubes vertically in a 70° C. oven and monitoring the breakout of brine over time. A method of fitting the observed coalescence data has been developed yielding the rate equation: $y=a(1-e^{-kt})$ where y is the volume of lower phase that has coalesced per total volume of emulsion, a is the plateau value, k is the coalescence rate constant, and t is time.

FIGS. 10 through 14 show both the fitted coalescence curve (solid lines) and the observed values (+) for systems containing synthetic surfactant alone or synthetic surfactant plus sodium bicarbonate.

Table 4 lists the calculated values for the plateau level (a) and the coalescence rate constant (k) for the ten systems studied.

TABLE 4

| NaCl added to Neodol Ethoxy-sulfate Systems % | a = plateau level (extent of coalescence) | | k = coalescence rate constant | |
|---|---|---|---|---|
| | NaCl alone | with NaHCO$_3$ | NaCl alone | with NaHCO$_3$ |
| 3.83 | 0.409 | 0.457 | 0.103 | 0.101 |
| 5.33 | 0.426 | 0.525 | 0.097 | 0.145 |
| 6.83 | 0.469 | 0.524 | 0.132 | 0.216 |
| 10.83 | 0.494 | 0.480 | 0.148 | 0.304 |
| 12.83 | 0.505 | 0.419 | 0.130 | 0.514 |
| NaHCO$_3$ = 1.2% | | | | |

Systems that have fast rates of coalescence are expected to have low interfacial viscosities and are more likely to coalesce to form an oil bank causing a greater reduction in the residual oil saturation.

Preflush tests were conducted to analyze the effect of sodium bicarbonate on reservoir rock divalent ions. These tests were performed using two 10-in. unfired consolidated Berea sandstone cores. Each core was saturated and equilibrated with 3 percent NaCl and 1,000 ppm each calcium and magnesium ions. Three fourths of a pore volume of either 3 percent NaCl or 2.2 percent sodium bicarbonate plus 1.5 percent NaCl was injected and the cores were shut-in for 1 week at 42° C.; then flow was resumed and the effluent was analyzed for calcium and magnesium. During the postflood procedure, the pressure drop across the core was monitored to detect any permeability loss caused by plugging. No change in pressure drop across the core was observed during this experiment.

Figure 15:
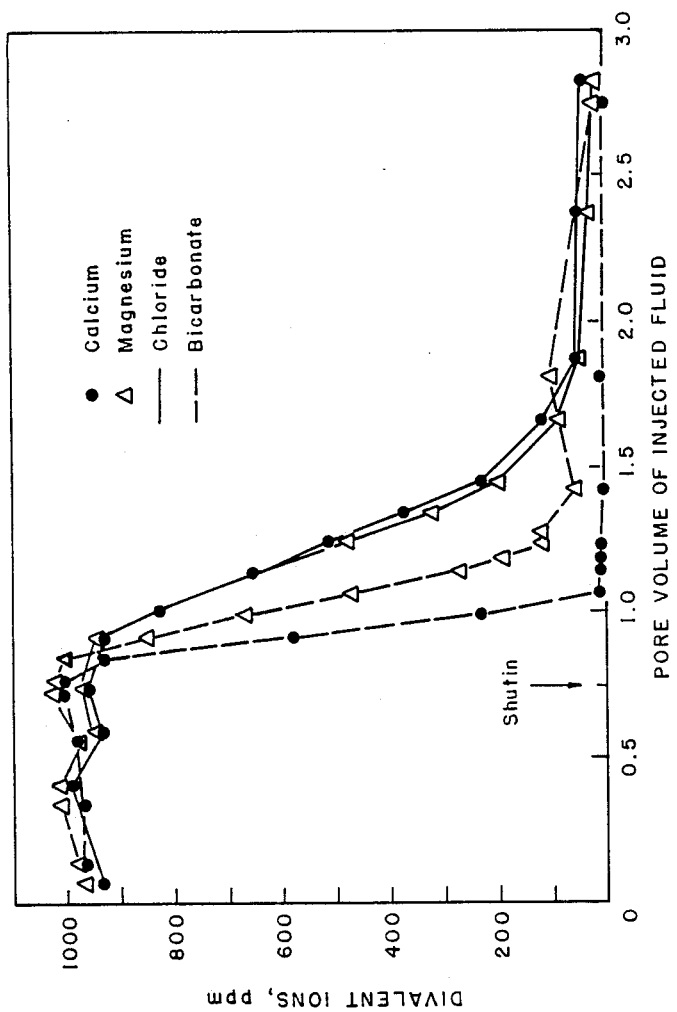
FIG. 15 is a graphical representation of a plot of divalent ion concentration in effluent after sodium bicarbonate or sodium chloride solutions were shut into Berea sandstone cores for 1 week at 42° C., with effluent being analyzed after flow was resumed.

FIG. 15 shows that a detectable difference does occur between a sodium (bicarbonate) preflush and a chloride brine preflush. The larger area under the magnesium and calcium curves in the chloride experiment implies that divalent ions are precipitated during the shut-in period using bicarbonate. In general, there is a 1.0-pore volume lag in the reduction in divalent ion concentration using chloride brine. At a frontal advance rate of 1 ft/d, an additional 1.3 years would be required to preflush a 10-acre pattern using chloride brine than a preflush using sodium bicarbonate brine.

Figure 16:
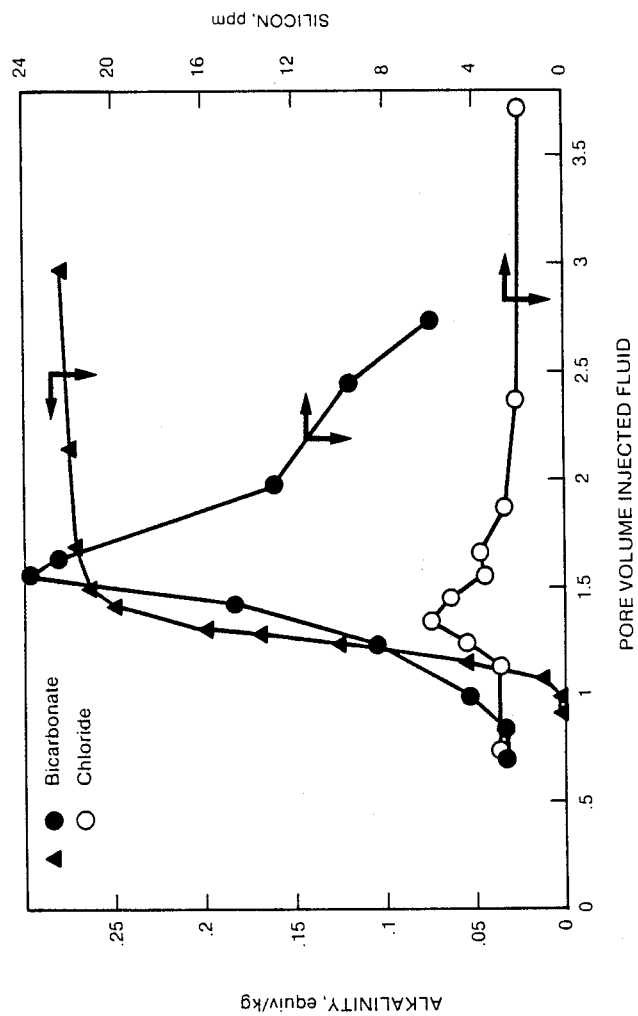
FIG. 16 is a graphical representation of the silicon concentration in the effluent after sodium bicarbonate or sodium chloride solutions were contacted with Berea sandstone cores for 1 week at 42° C. with the effluent from the bicarbonate preflush being analyzed for total alkalinity to determine breakthrough of bicarbonate.

FIG. 16 shows the concentration of silicon in the effluent after sodium bicarbonate (2.2 percent) or sodium chloride (3.0 percent) solutions were in contact with Berea sandstone for 1 week. Shortly after 1 pore volume of fluid was injected, the concentration of silicon rose to 24 ppm in the bicarbonate solution and to 6 ppm in the chloride solution. Alkalinity in the effluent was also measured to determine breakthrough of the bicarbonate solution. Sodium bicarbonate broke through at 1 pore volume and quickly rose to the injected concentration.

Table 5 lists the silicon concentrations in effluents from corefloods using stronger alkaline solutions. The higher level of silicon in the effluent at higher pH indicates a much greater reactivity with quartz. The data of Table 5 demonstrates the minimization of quartz dissolution utilizing a low alkaline pH sodium bicarbonate flooding solution, so that silicon concentrations will not exceed 24 ppm.

TABLE 5

| Silicon Concentration in Produced Fluids From Alkaline Berea Corefloods | | |
|---|---|---|
| Alkali | Wt. % Na$_2$O | Peak Si Levels ppm |
| NaHCO$_3$ | 0.44 | 24 |
| Na$_2$CO$_3$ | 0.50 | 33 |

TABLE 5-continued

Silicon Concentration in Produced
Fluids From Alkaline Berea Corefloods

| Alkali | Wt. % Na$_2$O | Peak Si Levels ppm |
|---|---|---|
| Na$_2$CO$_3$ | 1.00 | 47 |
| NaOH | 0.50 | 210 |
| NaOH | 1.00 | 420 |
| Na$_4$SiO$_4$ | 0.50 | 999 (1,132)* |
| Na$_4$SiO$_4$ | 1.00 | 2548 (2,263)* |

*Injected Si levels in parentheses

To ensure that the difference in the divalent ion concentration in the effluent was not a result of a variation in properties of the core, the test was repeated. The core previously injected with chloride solution was now injected with sodium bicarbonate solution and vice versa. The chemicals were continuously injected (no shut-in period), and the effluent was analyzed for divalent ion concentration as before. Calcium and magnesium ion concentrations were analyzed with an atomic absorption spectrophotometer. Silicon was determined by forming a yellow complex with molybdic acid and measuring the absorbance at 450 nm with a Beckman spectrophotometer. Alkalinity was measured by titration with standardized 0.1 N HCl to a methyl red endpoint (pH 4.8).

Table 6 lists the concentration of divalent ions flushed from the Berea sandstone in equilibrium with the divalent ions. The average weight of calcium displaced by the sodium bicarbonate preflush was 29 percent lower than when using the chloride preflush. Likewise, the weight of magnesium displaced from each core was an average of 11 percent lower using the sodium bicarbonate preflush solution than when using the chloride preflush solution. Reproducibility of the results obtained in the two trials was greater than 90 percent.

TABLE 6

Concentration of Divalent Ions flushed
per volume of rock pore space-Temperature was
maintained at 45° C. for Trial 1 and 49° C. for Trial 2

| Preflush | Magnesium mg/cm$^3$ | | Calcium mg/cm$^3$ | |
|---|---|---|---|---|
| | Trial 1 | Trial 2* | Trial 1 | Trial 2* |
| 2.2% NaHCO$_3$ 1.5% NaCl | 1.02 | 1.10 | 0.79 | 0.82 |
| 3.0% NaCl | 1.13 | 1.26 | 1.17 | 1.10 |

*Cores were reversed, presaturated with divalent ions, and preflushed using sodium bicarbonate and chloride or chloride alone. The preflush chemicals were not shut in. 1.9 core volumes of each chemical were continuously injected.

These results indicate that addition of sodium bicarbonate to preflush waters is more effective at reducing divalent ion concentration than use of sodium chloride brine. The reduced concentration of divalent ions in the resident brine suggests that bicarbonate may be precipitating calcium as calcium carbonate and magnesium as magnesium silicate, thereby reducing their concentrations in the resident brine. This will reduce the amount of surfactant-divalent ion precipitation during the injection of slugs containing low concentrations of surfactant.

Oil-displacement tests were performed at a linear advance rate of 1 ft/d. Hassler core holders were maintained at 50° C. in all tests using heated thermal jackets. Overburden pressure was maintained at greater than 200 psi. The viscosities of all chemical slug solutions were measured with a Brookfield LVT cone/plate viscometer to ensure that all graded polymer solutions were of the same viscosity ±2 cp. The polymer used in these tests was Flocon 4800C (12.5 percent active) obtained from Pfizer Chemical Company. The surfactants used were Neodol 25-3S alcohol ethoxysulfate (58.8 percent active) obtained from Shell Chemical Co. and TRS 10-410 petroleum sulfonate (62 percent active) obtained from Witco Chemical Co., Sonneborn Division. Tronacarb, sodium bicarbonate (94 percent active), was obtained from Kerr-McGee Chemical Co.

Table 7 lists the oil recovery efficiency using the surfactant-enhanced bicarbonate systems found to be most promising in the emulsion screening tests.

TABLE 7

Oil Displacement at 50° C. for Surfactant-Enhanced
Sodium Bicarbonate Floods of Wilmington Crude Oil
(Viscosity = 65 cp at 50° C.)

Figure 17:
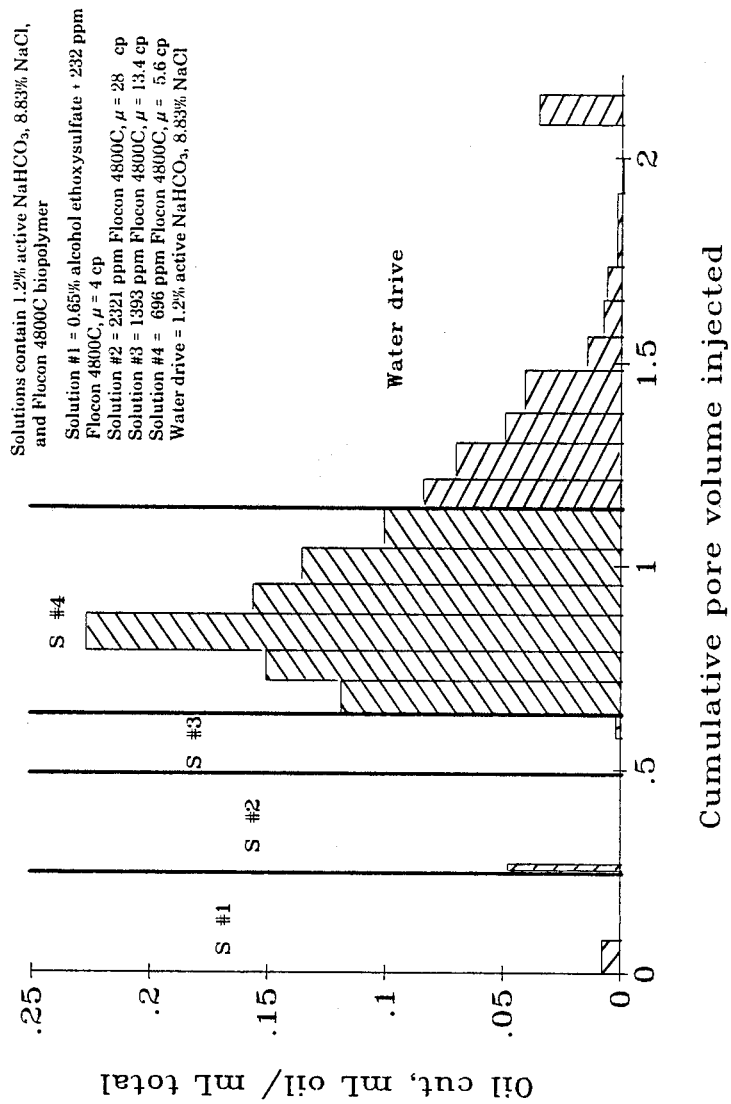
FIG. 17 is a graphical representation of oil cut versus cumulative pore volumes injected, in a surfactant enhanced sodium bicarbonate flood injected into Berea sandstone initially at residual oil saturation, with viscosity of Wilmington crude oil=65 cp at 50° C.
Figure 18:
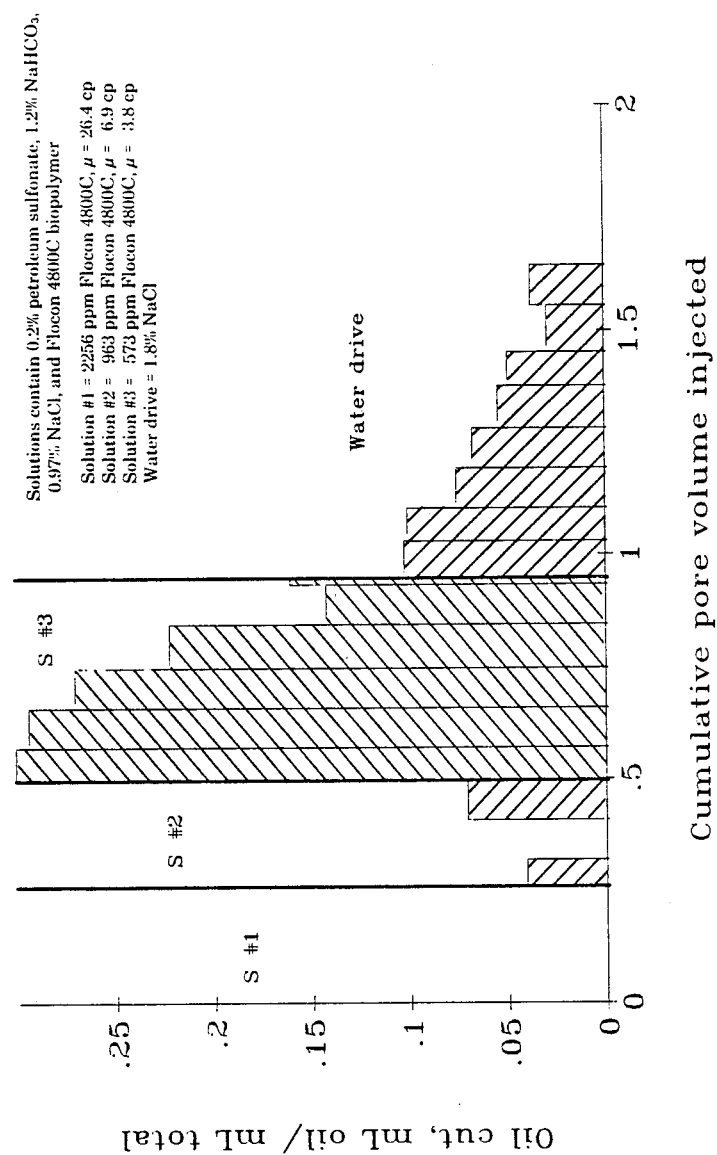
FIG. 18 is a bar graph representation of oil cut versus cumulative pore volumes injected in a surfactant enhanced sodium bicarbonate flood injected into Berea sandstone initially at residual oil saturation, with viscosity of Wilmington crude oil=65 cp at 50° C., and utilizing a different surfactant from that of FIG. 17.

| # | | $S_{orw}$ | $S_{orc}$ | RE % |
|---|---|---|---|---|
| | Surfactant-enhanced bicarbonate plus polymer | | | |
| 1 | ¼ Pv-0.65% alcohol ethoxylate, 1.2% NaHCO$_3$, 8.83% NaCl, and 58 ppm total polymer followed by ¾ PV of 1100 ppm total polymer | 43.5 | 33.4 | 23.2 |
| 2 | (graded as shown in FIG. 17) This was followed by 1 PV of a 8.83% NaCl water drive | 38.8 | 33.9 | 12.6 |
| 3 | 1 PV-0.2% petroleum sulfonate, 1.2% NaHC0$_3$, 0.97% NaCl, and 1100 ppm total polymer (graded as shown in FIG. 18) This was followed by 1 PV of a 1.8% NaCl water drive | 48.6 32.6 33.1 43.2 | 29.9 | 30.8 |
| | Surfactant plus polymer | | | |
| 5 | PV-0.2% petroleum sulfonate + 1.8% NaCl with 1100 ppm total polymer graded followed by 1 PV of a 1.8% NaCl water drive | 43.5 | 32.1 | 26.2 |
| | Bicarbonate plus polymer | | | |
| 6 | 1 PV-1.2% NaHCO$_3$ + 0.97% NaCl with 1100 ppm total polymer graded followed by 1 PV of a 1.8% NaCl water drive | 41.4 | 37.1 | 10.4 |

$S_{orw}$ is the residual oil saturation after water flooding, in percentage of pore volume. $S_{orc}$ is the residual oil saturation after chemical flooding, in percentage of pore volume.

Tests described herein are reported in the attached Appendices A and B, which are incorporated herein. Projected recovery costs are set forth in Appendix A (page 12), illustrating efficient and economical recovery utilizing methods of the present invention.

FIG. 17 shows the oil cut produced versus cumulative pore volumes of injected fluid for the system containing sodium bicarbonate, ethoxysulfate and polymer. In this test, a relatively high concentration of surfactant was injected first, followed by three graded polymer slugs. All chemical slugs contained 1.2 active percent sodium bicarbonate and 8.83 percent sodium chloride (pH 9). The average oil recovery efficiency was 24 percent. FIG. 18 shows the oil recovery results for the sodium bicarbonate system enhanced with petroleum sulfonate. In this test, 0.2 percent of petroleum sulfonate was injected into the core for approximately 1 pore volume. The surfactant slugs contained 1.2 active percent sodium bicarbonate and 0.97 percent sodium chloride with decreasing amounts of polymer (pH 9). The average oil recovery efficiency was 32 percent.

Since the sodium bicarbonate solution enhanced with petroleum sulfonate recovered the most residual oil, it was chosen as the system to be used in performing control studies. One control test was performed using petroleum sulfonate and polymer without added sodium bicarbonate (pH 5), and the other control was run using sodium bicarbonate and polymer without surfactant (pH 9). The data in Table 7 show that neither of the controls recovered as much Wilmington crude oil as did the three chemicals together. The results indicate that sodium bicarbonate enhanced with low concentrations of surfactant and polymer can recover from 6 to 20 percent more residual oil than either of the two components alone. A synergistic relationship appears to exist, as it did in the IFT tests, between sodium bicarbonate and low concentrations of surfactant (and polymer).

Accordingly, it will be appreciated that improved methods for tertiary oil recovery have been provided in accordance with the present invention. Moreover, it will be appreciated that such methods have been described which provide for economical oil recovery while reducing the potential for scaling and fouling of producing well bores from precipitation of dissolved silicate minerals, as well as difficulties associated with dissolution of silicates in the flooding solution from the reservoir itself, which can lead to reservoir fracture at the injection well and short circuiting or other ineffecting routing of the flow of flooding solution between the injection well(s) and the recovery well(s). While the invention has been described with respect to certain specific embodiments, it will be appreciated that various adaptations and modifications may be made without departing from the spirit and scope of the present invention.

What is claimed is:

1. A method for flooding of a subterranean petroleum bearing formation for tertiary oil recovery, comprising the steps of providing at least one production well having at least one inlet within the subterranean petroleum bearing formation, and at least one injection well having at least one outlet within the subterranean petroleum bearing formation, injecting into the petroleum bearing formation through the injection well, a low alkaline pH aqueous sodium bicarbonate flooding solution having a pH in the range of from about 8.25 to about 9.25 comprising from about 0.25 to about 5 weight percent of sodium bicarbonate, from about 0.05 to about 1.0 weight percent of petroleum recovery surfactant, and from about 1 to about 20 weight percent of sodium chloride, based on the total weight of the aqueous flooding solution, withdrawing through at least one inlet of said production wells, an oil and water mixture comprising petroleum from the subterranean petroleum bearing formation and at least a portion of the low alkaline pH sodium bicarbonate aqueous flooding solution, and separating the oil from the aqueous oil and water mixture.

2. A method in accordance with claim 1 wherein said low alkaline pH aqueous flooding solution comprises from about 0.75 to about 1.5 weight percent of sodium bicarbonate.

3. A method in accordance with claim 1 wherein a dissolved silicon content in an aqueous portion of said oil and water mixture withdrawn through said inlet of said production well is less than 24 ppm.

4. A method in accordance with claim 1 wherein a dissolved silicon content in an aqueous portion of said oil and water mixture withdrawn through said inlet of said production well is less than about 10 ppm.

5. A method for aqueous flooding of a subterraneous petroleum bearing formation for tertiary oil recovery comprising the steps of providing at least one production well having at least one inlet within the subterranean petroleum bearing formation, and at least one injection well having at least one outlet within the subterranean petroleum bearing formation, injecting into the petroleum bearing formation through the injection well from about 0.1 to about 2.0 pore volumes of low alkaline pH aqueous sodium bicarbonate preflush solution having a pH in the range of from about 8.25 to about 9.25 comprising from about 0.25 to about 5 weight percent of sodium bicarbonate, and from about 1 to about 20 weight percent of sodium chloride, based on the total weight of the aqueous flooding solution, said pore volume being the pore volume of the subterranean petroleum bearing formation, subsequently injecting a low alkaline pH aqueous sodium bicarbonate flooding solution containing at least about 0.25 weight percent of petroleum recovery surfactant, withdrawing through at least one inlet of said production wells, an oil and water mixture comprising petroleum from the subterranean petroleum bearing formation and at least a portion of the low alkaline pH sodium bicarbonate aqueous preflush solution and flooding solution, and separating the oil from the aqueous oil and water mixture.

6. A method in accordance with claim 5 wherein said preflush solution contains less than about 0.1 weight percent of petroleum recovery surfactant, based on the total weight of said preflush solution.

* * * * *

UNITED STATES PATENT AND TRADEMARK OFFICE
CERTIFICATE OF CORRECTION

PATENT NO. : 4,817,715
DATED : April 4, 1989
INVENTOR(S) : Deborah Ann Peru

It is certified that error appears in the above-identified patent and that said Letters Patent is hereby corrected as shown below:

Title page:

In the Abstract, Line 9, change the second occurrence of "and" to --to--.

Column 3, Line 17, change "chlorde" to --chloride--.

Column 7, Line 9, change "compatbile" to --compatible--.

Column 9, Line 34, put in a return/space between Line 34 and 35.

Column 11, Line 26, change "N HCl" to --NaCHl--.

Column 12, Line 32, between "5" and "PV" insert --1--.

Column 12, Line 40, insert "RE% = Recovery Efficiency = $\frac{S_{orw} - S_{orc}}{S_{orw}} \times 100$ Signed and Sealed this Twenty-sixth Day of December, 1989

*Attest:*

JEFFREY M. SAMUELS

*Attesting Officer*   *Acting Commissioner of Patents and Trademarks*